(12) United States Patent
Son

(10) Patent No.: US 9,120,440 B2
(45) Date of Patent: Sep. 1, 2015

(54) AUTOMOBILE SHOCK ABSORBER WHICH USES PERMANENT MAGNETS AND ELECTROMAGNETS

(75) Inventor: Song-Nam Son, Sacheon-si (KR)

(73) Assignee: Dongchun Co., Ltd., Busan-si (KR)

( * ) Notice: Subject to any disclaimer, the term of this patent is extended or adjusted under 35 U.S.C. 154(b) by 0 days.

(21) Appl. No.: 13/988,442

(22) PCT Filed: Apr. 16, 2012

(86) PCT No.: PCT/KR2012/002867
§ 371 (c)(1),
(2), (4) Date: Jun. 6, 2013

(87) PCT Pub. No.: WO2013/137516
PCT Pub. Date: Sep. 19, 2013

(65) Prior Publication Data
US 2015/0001862 A1    Jan. 1, 2015

(30) Foreign Application Priority Data
Mar. 13, 2012 (KR) .................. 10-2012-0025443

(51) Int. Cl.
*B60R 19/03* (2006.01)
*B60R 19/04* (2006.01)
*B60R 19/48* (2006.01)
*H01F 7/02* (2006.01)

(52) U.S. Cl.
CPC ............. *B60R 19/04* (2013.01); *B60R 19/03* (2013.01); *B60R 19/483* (2013.01); *H01F 7/021* (2013.01)

(58) Field of Classification Search
CPC ............ F16F 9/461; F16F 9/535; F16F 15/03; F16F 2222/06; F16F 9/34; B60P 3/08; G07B 15/063; B62D 1/28; G01S 13/931; G01C 21/28
USPC ............................ 293/120; 180/274; 280/784
See application file for complete search history.

(56) References Cited

U.S. PATENT DOCUMENTS

| | | | | |
|---|---|---|---|---|
| 3,147,176 | A * | 9/1964 | Haslam | 428/55 |
| 4,807,915 | A * | 2/1989 | Shyi | 293/132 |
| 5,971,451 | A * | 10/1999 | Huang | 293/102 |
| 8,180,585 | B2 * | 5/2012 | Cech et al. | 702/65 |
| 2005/0087410 | A1 * | 4/2005 | Namuduri et al. | 188/267.2 |
| 2009/0001976 | A1 * | 1/2009 | Cech et al. | 324/228 |
| 2009/0167300 | A1 * | 7/2009 | Cech et al. | 324/239 |

FOREIGN PATENT DOCUMENTS

KR    10-1022561    3/2011

* cited by examiner

*Primary Examiner* — Kiran B Patel
(74) *Attorney, Agent, or Firm* — Jordan and Hamburg LLP

(57) ABSTRACT

A shock absorber of a vehicle employing permanent magnets and electromagnets includes a first permanent magnet on an internal surface of a bumper face; a second permanent magnet on the front surface of a shock absorbing foam, which is installed on a front surface of the vehicle body and has the same polarity as the first permanent magnet; and an electromagnet on the internal surface of the shock absorbing foam, and has the same polarity as that of the second permanent magnet when the vehicle operating speed exceeds the standard vehicle speed, wherein the first permanent magnet and the second permanent magnet are respectively comprised of a plurality of partitioned magnet blocks; and their external surfaces are coated with rubber or synthetic resin thereby reducing damage.

4 Claims, 3 Drawing Sheets

AUTOMOBILE SHOCK ABSORBER WHICH USES PERMANENT MAGNETS AND ELECTROMAGNETS

TECHNICAL FIELD

The present invention relates to a shock absorber provided in a bumper of a vehicle using permanent magnets and electromagnets in which the bumper is configured to effectively absorb and buffer shock from a vehicle collision based on the standard vehicle operating speed of 60 km/h by means of an adaptive buffering capacity due to the repulsive force between the first permanent magnet and the second permanent magnet installed sequentially between the internal surface of a bumper face and the front surface of a vehicle, along with the repulsive force of electromagnets, which are installed on the rear side of the second permanent magnet and operated when the vehicle operating speed exceeds 60 km/h or when the distance between the object ahead and the driver's vehicle is in the range of about 6 to 8 m, wherein the durability of the permanent magnets being composed of a plurality of magnet blocks is extended by coating the magnet blocks with rubber or synthetic resin, and also the area of damage in the vehicle can be minimized at the time of collision.

BACKGROUND OF THE INVENTION

[Reference] Korean Patent No. 10-1022561 filed Mar. 8 20110.

In general, when a vehicle collides with another vehicle or an object, bumpers consisting of a bumper face and a shock absorbing foam installed on the front and rear surfaces of the vehicle absorb and buffer the shock being delivered thereto at the time of collision thereby reducing the damage on the vehicle as well as protecting passengers in the vehicle.

That is, as the bumper face is being pushed toward the vehicle body and the shock absorbing foam is pressed between the vehicle body and the bumper face, the shock due to the collision is being absorbed and buffered.

The above type of a bumper can fully serve its intended function when the vehicle collision occurs at a relatively low driving speed. However, when the collision occurs while the vehicle is driven at a speed of over 30~40 Km/h there is a limitation on the buffering capacity of the shock absorbing foam and the bumper face, and the shock absorbing foam are easily destroyed by the collision shock thus raising a problem.

To solve the above-mentioned problem, a vehicle bumper utilizing a magnetic force due to two permanent magnets with an equal polarity installed at regular intervals has been proposed. In other words, the collision shock on the bumper is absorbed by the repulsive force between the two permanent magnets with the same polarity.

Accordingly, when the vehicle collision occurs while the vehicle is driven at a speed of over 30~40 Km/h there will be an added shock buffering capacity provided to the vehicle due to the repulsive force between the two permanent magnets, which enables to protect and restore the shock absorbing foam to its original shape, which might have been pressed toward the vehicle at the time of collision as the bumper face is being destroyed by the collision shock.

However, the above vehicle bumper employing the magnetic power has also limitation in its shock absorbing capacity when the collision occurs while the vehicle is driven at a speed of over 60 km/h, when the vehicle body including both the bumper face and the shock absorbing foam will be seriously damaged and passenger in the vehicle cannot be protected from serious damage.

As an alternative, the inventors of the present invention previously filed an application regarding an improved vehicle bumper provided with a permanent magnet and an electromagnet, which can effectively buffer a collision shock thereby preventing vehicle damage as well as passengers in the vehicle regardless of the vehicle speed at the time of the collision, and was granted in Korea, wherein a shock absorber of a vehicle using permanent magnets and electromagnets, including a first permanent magnet installed on the internal surface of the bumper face; a second permanent magnet which is installed on the front surface of a shock absorbing foam, installed on the front surface of the vehicle body, and has the same polarity as that of the first permanent magnet; and an electromagnet which is installed on the internal surface of the shock absorbing foam, and has the same polarity as that of the second permanent magnet thereby enabling to absorb a collision shock due to the strong repulsive force provided between the permanent magnet and the electromagnet even when the vehicle operating speed exceeds 60 km/h.

However, the above patent has problems that because the bumper face and the permanent magnet installed in a vehicle are formed as a single unit, respectively, they can be easily damaged in their entirety or malformed by the collision shock and because they are exposed to the outside of a vehicle they are vulnerable to oxidation process resulting in corrosion and their magnetic power also deteriorate according to time passage thus not functioning properly.

SUMMARY OF THE INVENTION

Disclosed is a shock absorber provided in a bumper of a vehicle using permanent magnets and electromagnets in which the bumper has a structure to effectively absorb and buffer shock from a vehicle collision based on the standard vehicle operating speed of 60 m/h by means of an adaptive buffering capacity due to the repulsive force between the first permanent magnet and the second permanent magnet installed sequentially between the internal surface of a bumper face and the front surface of a vehicle along with the repulsive force of electromagnets, which are installed on the rear of the second permanent magnet and operated when the vehicle operating speed exceeds 60 km/h or when the distance between the object ahead and the driver's vehicle is in the range of about 6 to 8 m, wherein the durability of the permanent magnets being composed of a plurality of magnet blocks is extended by coating the magnet blocks with rubber or synthetic resin, and also the area of damage in the vehicle can be minimized at the time of collision.

The present invention provides a shock absorber of a vehicle employing permanent magnets and electromagnets, including: a first permanent magnet installed on the internal surface of the bumper face; a second permanent magnet installed on the front surface of a shock absorbing foam, which is installed on the front surface of the vehicle body, and has the same polarity as that of the first permanent magnet; and an electromagnet which is installed on the internal surface of the shock absorbing foam, and has the same polarity as that of the second permanent magnet when the vehicle operating speed exceeds the standard vehicle speed, wherein the first permanent magnet and the second permanent magnet are respectively composed of a plurality of partitioned magnet blocks with an appropriate size; and their external surfaces are coated with rubber or synthetic resin thereby reducing damage area at the time of vehicle collision, and maintaining the same level of magnetism permanently by preventing oxidation.

The present invention also provides permanent magnets and electromagnets with the same structure on the side doors of a vehicle thereby buffering and minimizing a collision impact due to the repulsive force at the time of vehicle collision on the sides of a vehicle.

In an embodiment, the present invention provides a first permanent magnet installed in the bumper face and a second permanent magnet installed on the vehicle body, both being composed of partitioned magnet blocks with an appropriate size thereby reducing the damage on the permanent magnets at the time of a collision.

In another embodiment, the present invention provides a magnet with an improved durability by coating the external surface of the magnet blocks with rubber or synthetic resin thereby preventing oxidation.

In a further embodiment, the present invention provides a shock absorber of a vehicle employing permanent magnets and electromagnets wherein the first permanent magnet and the second permanent magnet are also provided on the side doors of a vehicle with the same structure, thereby enabling to buffer and minimize the collision shock due to the repulsive force by the magnets when the collision occurs on the side of the vehicle.

The present invention provides a shock absorber of a vehicle using permanent magnets and electromagnets, including: a first permanent magnet installed on the internal surface of the bumper face; a second permanent magnet which is installed on the front surface of a shock absorbing foam, installed on the front surface of the vehicle, and has the same polarity as that of the first permanent magnet; and an electromagnet which is installed on the internal surface of the shock absorbing foam, and has the same polarity as that of the second permanent magnet when the vehicle operating speed exceeds time standard vehicle speed, wherein the first permanent magnet and the second permanent magnet are respectively composed of a plurality of partitioned magnet blocks with an appropriate size; and their external surfaces are coated with rubber or synthetic resin thereby reducing damage area at the time of vehicle collision, and maintaining the same level of magnetism permanently by preventing oxidation.

Further, the present invention also provides the first permanent magnet and the second permanent magnet with the same structure on the side doors of a vehicle thereby buffering and minimizing a collision impact due to the repulsive force at the time of vehicle collision on the sides of a vehicle.

As described above, the present invention can intellectually and effectively absorb and buffer a collision shock according to a vehicle operating speed based on the standard vehicle speed thereby preventing and minimizing the damage of the vehicle and the passengers therein. In particular, the present invention provides partitioned blocks of permanent magnets and a coated layer thereby reducing the damage on the permanent magnets at the time of a collision and also preventing oxidation thereby enabling long term retaining of magnetic power.

DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 1:
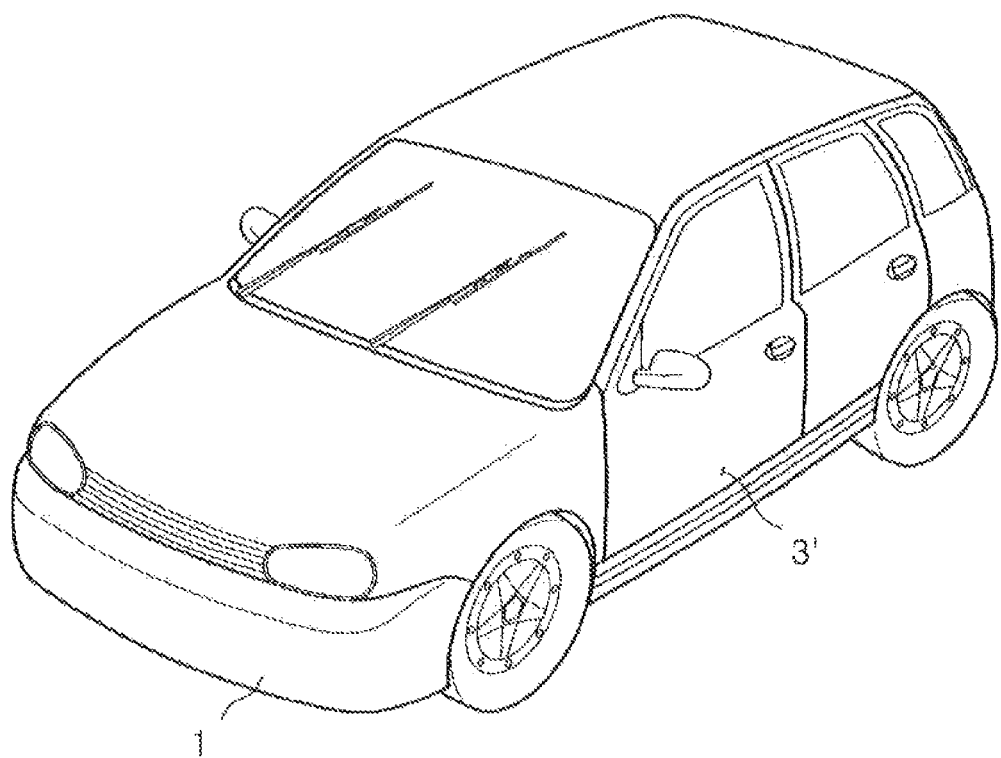
FIG. 1 is an exemplary perspective view of a vehicle provided with a shock absorber using permanent magnets and electromagnets according to an embodiment of the present invention.

FIG. 1 is an exemplary perspective view of a vehicle provided with a shock absorber using permanent magnets and electromagnets according to an embodiment of the present invention.

Figure 2:
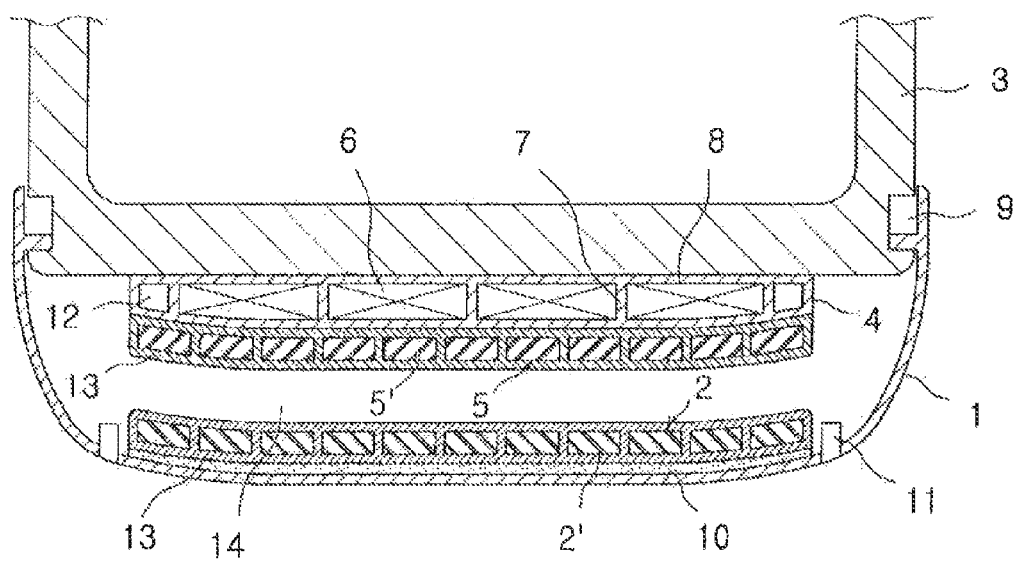
FIG. 2 is a horizontal sectional view of a vehicle bumper provided according to an embodiment of the present invention.

FIG. 2 is a horizontal sectional view of a vehicle bumper provided with a shock absorber using permanent magnets and electromagnets according to an embodiment of the present invention.

Figure 3:
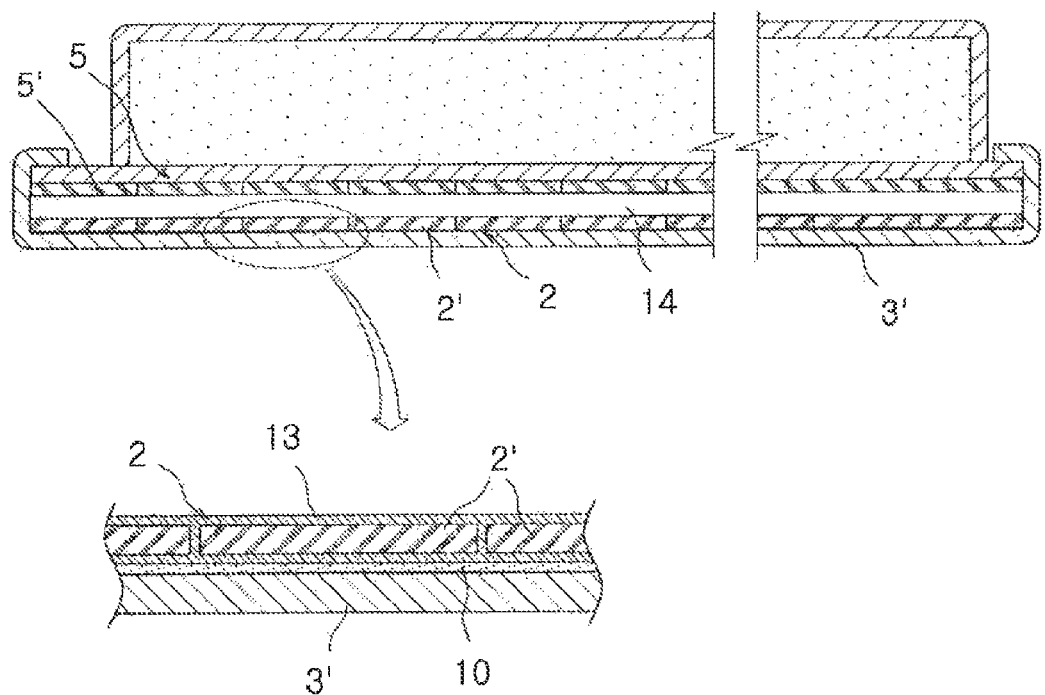
FIG. 3 is a partially enlarged sectional view of a side door illustrating the installed state of according to an embodiment of the present invention.

FIG. 3 is a partially enlarged sectional view of a side door illustrating the installed state of a shock absorber using permanent magnets and electromagnets according to an embodiment of the present invention.

The present invention relates to a shock absorber of a vehicle using permanent magnets and electromagnets, including a first permanent magnet 2 installed on the internal surface of the bumper face 1; a second permanent magnet 5 which is installed on the front surface of a shock absorbing foam 4, installed on the front surface of the vehicle body 3, so as to face with and have the same polarity as that of the first permanent magnet 2; and an electromagnet 6 which is installed on the inside of the shock absorbing foam 4 so as to face with and have the same polarity as that of the second permanent magnet 5 when the vehicle operating speed exceeds the standard vehicle speed.

The electromagnet 6 is respectively installed in the internally provided space 8 divided by a plurality of reinforcing units 7, which are installed at regular intervals inside of the shock absorbing foam 4 and support the second permanent magnet 5 from behind.

The bumper face 1 is installed to be pushed by a shock to the rear side by the drift space 9 provided in both sides of a vehicle body 3 at the time of a vehicle collision.

The first permanent magnet 2 is installed on the internal surface of the bumper face 1 so that the repulsive force can only act toward the second permanent magnet 5 via a magnetism intercepting plate 10.

The standard vehicle driving speed is set at 60 km/h, and it can be varied according to the size of the repulsive force acting between the first permanent magnet 2 and the second permanent magnet 5, which is measured by a speedometer of a vehicle.

The standard distance is set at 6 to 8 m, and it is measured by a distance detecting sensor 11 installed inside a fog lamp or an emergency lamp mounted on the front surface of a vehicle.

In one side of the interior of the shock absorbing foam 4 there is installed a control box 12 which is operated within the standard speed and standard distance considering the distance from a nearby object calculated based on the driving speed of a vehicle using the speedometer and the distance detecting sensor 11 for the operation of the electromagnet 6.

The first permanent magnet 2 and the second permanent magnet 5 consist of a plurality of partitioned magnet blocks 2' and 5' with an appropriate size, and their external surface is coated with rubber or synthetic resin, etc. The coating layer 13 is established in such a structure that magnet blocks 2' and 5', which are coated either simultaneously in their entirety or coated individually for magnet blocks 2' and 5', are installed to be connected end-to-end to the vehicle body.

The first permanent magnet 2 and the second permanent magnet 5 are installed so that the same polarity can face with each other on the side doors 3' of the vehicle body 3. In addition, in the first permanent magnet 2, magnetism intercepting plates 10 are installed in the internal surface of the side doors 3' so that the repulsive force can only act toward the second permanent magnet 5.

The unexplained reference numeral 14 in FIGS. 2 and 3 indicates an acting space.

The shock absorber of a vehicle using the permanent magnets and electromagnets described above is a protective apparatus installed on the front surface and the rear surface or on the side doors of a vehicle body 3 to absorb and buffer a shock being impacted at the time of a collision with another vehicle or an obstacle thereby preventing injuries of passengers in the vehicle.

In particular, the shock absorber of the present invention is advantageous in that it can effectively perform the shock absorbing ability at the time of a collision regardless of the operating speed of the vehicle.

As shown in FIG. 2, the excellent shock absorbing ability of the above shock absorber is provided by the employment of permanent magnets and the electromagnets, wherein the first permanent magnet 2 is installed on the internal surface of the bumper face 1, the second permanent magnet 5 is installed on the front surface of the shock absorbing foam 4, which is installed on the front surface of the vehicle body 3 so that the same polarity of the second permanent magnet 5 as that of the first permanent magnet 2 faces with each other, and electromagnets 6 which are set to operate when the vehicle operating speed exceeds the standard speed to have the same polarity as that of the second permanent magnet 5 are installed inside the shock absorbing foam 4 thereby enhancing the repulsive force.

That is, according to the vehicle operating speed, the size of the repulsive force due to magnetic force is applied with adaptive difference on the repulsive force acting space 14 between the bumper face 1 and the shock absorbing foam 4 thereby enabling an effective buffering function. The detailed actions are described further in detail as follows.

First, when a vehicle operating speed is less than 60 km/h, which is lower than the standard operation speed set for the electromagnets 6 installed inside the shock absorbing foam 4, the repulsive force between the first permanent magnet 2 installed on the internal surface of the bumper face 1 and the second permanent magnet 5 installed on the front surface of the shock absorbing foam 4.

Accordingly, when a vehicle collides with another vehicle or an obstacle at a driving speed of lower than 60 km/h, the repulsive force acting between the first permanent magnet 2 and the second permanent magnet 5 works on the inside of the repulsive force acting space 14, which rectifies the buffering power thereby enabling to more effectively absorb and buffer a collision even when the bumper face 1 is being pushed toward the vehicle body 3 by the collision.

Furthermore, the bumper face 1 is installed to be pushed toward a rear side by the drift space 9 formed in the vehicle body 3 and thus it is simply being pushed to the rear side without being destroyed.

In addition, the bumper face 1 is instantly restored to its original shape due to the repulsive force acting between the first permanent magnet 2 and the second permanent magnet 5, and thus any shock due to a second collision can be effectively absorbed and buffered. Therefore, the bumper face 1 and the vehicle body 3 can be prevented from being damaged.

Here, since the first permanent magnet 2 is attached to the magnetism intercepting plate 10 on the bumper face 1 the magnetic power acting toward the bumper face 1 is blocked by the magnetism intercepting plate 10 and the magnetic power becomes to act only toward the repulsive force acting space 14 on the opposite side. Meanwhile, the second permanent magnet 5 is supported by the reinforcing units 7 installed perpendicular to the inside of the shock absorbing foam 4 and is thus prevented from being pushed to toward the vehicle body. Therefore, the repulsive force can act while a predetermined space is maintained between the first permanent magnet 2 and the second permanent magnet 5, thereby effectively buffering shock from a vehicle collision.

When the vehicle operating speed exceeds 60 km/h and the distance between the vehicle and an object ahead is within a range of about 6 to 8 m the condition meets both the standard speed and the standard distance set for the operation of the electromagnets 6 thus allowing the electromagnets 6 to act by the control box 12 along with the first permanent magnet 2 and the second permanent magnet 5.

Therefore, when a vehicle collides with another vehicle or an obstacle at a speed of lower than 60 km/h not only the repulsive force acting between the first permanent magnet 2 and the second permanent magnet 5 but also the repulsive force added due to the electromagnets 6 act on thereby further strengthening the buffering power of the vehicle bumper.

Accordingly, even when a greater impact is delivered to the bumper face 1, it is not pushed to the extent that it is damaged but is readily restored to its original position thereby effectively absorbing and buffering the shock generated at the time of a collision without any damage on the bumper face 1 or the vehicle body 3, also securing the safety of passengers in the vehicle.

Further, as shown in FIG. 3, the repulsive force also acts on the side doors 3' of a vehicle. In fact, the first permanent magnet 2 and the second permanent magnet 5 are installed inside of the side doors 3' so that the same polarity faces with each other. Therefore, at the time of a collision on the side of a vehicle, the collision shock is absorbed by the repulsive force acting between the first permanent magnet 2 and the second permanent magnet 5, which helps to restore it to its original state thereby reducing vehicle damage as well as preventing or minimizing injuries of passengers in the vehicle.

In particular, the first permanent magnet 2 and the second permanent magnet 5 are not composed of a single unit but are composed of a plurality of partitioned magnet blocks 2' and 5' with an appropriate size, and their external surfaces are protected either entirely or individually with a coating layer 13 of rubber or synthetic resin, etc., thus preventing the damage in the entirety but restricting the damage to a partial region. Therefore, the reduced damage area of a vehicle enables to reduce repair work and the cost thereof. In particular, the coating layer 13 blocks the permanent magnets from the external air to prevent oxidation and subsequent corrosion thereby enabling to retain the magnetic force for a long period of time.

As described above, the shock absorber of the present invention provides many advantages that it can absorb and buffer the shock being delivered to a bumper 100 by differential adaptation of the repulsive force which reinforces the bumper 100 according to the vehicle operating speed based on the standard vehicle driving speed, thereby minimizing the damage on the vehicle body 3 and securing the protection of passengers in the vehicle. Further, the shock absorber of the present invention employs a plurality of partitioned permanent magnets in the form of magnet blocks 2' and 5' along with a protective coating layer 13 thereby reducing damage and preventing corrosion by oxidation. Still further, the shock absorber of the present invention provides a repulsive force on the side doors 3' thereby preventing vehicle damages on the side and securing safety of passengers at the time of a collision.

It will be understood by those of skill in the art that numerous and various modifications can be made without departing from the spirit of the present invention. Therefore, it should be clearly understood that the forms of the present invention are illustrative only and are not intended to limit the scope of the present invention.

All documents and other information sources cited above are hereby incorporated in their entirety by reference.

What is claimed is:

1. A shock absorber for a vehicle comprising:
   a first permanent magnet on an internal surface of a bumper face;
   a second permanent magnet on a front surface of a shock absorbing foam on a front surface of the vehicle body and has the same polarity as that of the first permanent magnet; and
   an electromagnet on an internal surface of the shock absorbing foam, and has the same polarity as that of the second permanent magnet when the vehicle operating speed exceeds the standard vehicle speed,
   wherein the first permanent magnet and the second permanent magnet are respectively comprised of a plurality of partitioned magnet blocks.

2. The shock absorber according to claim 1, wherein the magnet blocks use permanent magnets and electromagnets coated with rubber or synthetic resin coating layer.

3. The shock absorber according to claim 1, wherein the electromagnet is respectively installed in an internally provided space divided by a plurality of reinforcing units which are installed at regular intervals inside of the shock absorbing foam and support the second permanent magnet from behind.

4. The shock absorber according to claim 1, wherein the first permanent magnet is installed inside of the bumper face via a magnetism intercepting plate, thereby allowing only the magnetism acting toward the direction of the repulsive force acting space while blocking the magnetism acting toward the direction of the bumper face.

* * * * *